C. O. BAUGHN.
NUT LOCK.
APPLICATION FILED FEB. 4, 1915.
1,189,908.
Patented July 4, 1916.
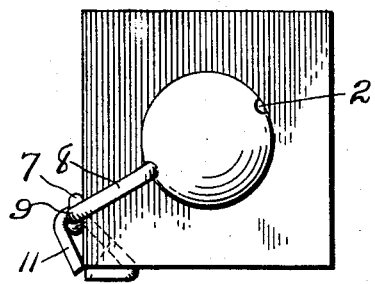
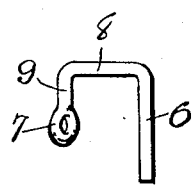
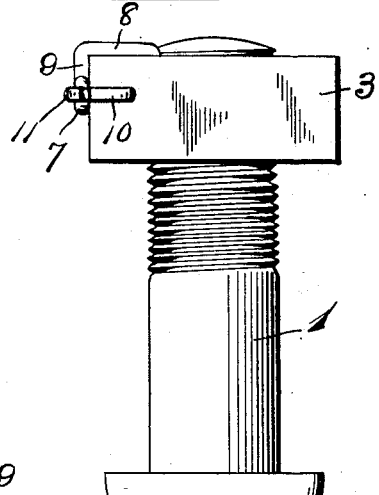
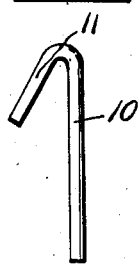
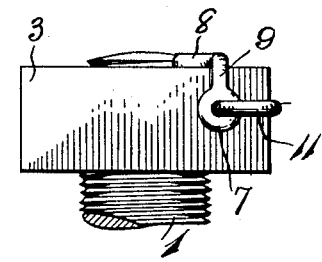
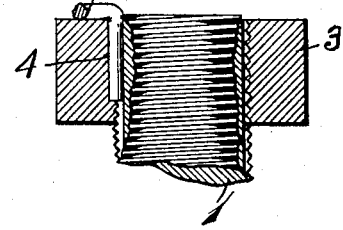
Witnesses
Edw. S. Hall
Carroll Bailey
Inventor
Charles O. Baughn
By Richard B. Owen
Attorney

UNITED STATES PATENT OFFICE.

CHARLES O. BAUGHN, OF LYONS, INDIANA.

NUT-LOCK.

1,189,908.  Specification of Letters Patent.  Patented July 4, 1916.

Application filed February 4, 1915. Serial No. 6,093.

*To all whom it may concern:*

Be it known that I, CHARLES O. BAUGHN, a citizen of the United States, residing at Lyons, in the county of Green and State of Indiana, have invented certain new and useful Improvements in Nut-Locks, of which the following is a specification.

This invention relates to nut locks and more particularly to that class of nut locks in which a key is adapted to be inserted within alining recesses in a nut and bolt.

An object of the invention is to provide a nut lock of this character having means for locking the key against accidental disengagement from the nut and bolt.

Another object is to provide a nut lock which is extremely simple in construction, cheap and easy to manufacture, and which is thoroughly reliable and efficient in its operation.

With these and other objects in view the invention consist in the novel features of construction, combination and arrangement of parts as will be hereinafter more fully described, illustrated in the accompanying drawings and claimed.

In the drawings: Figure 1 is a plan view of a nut and bolt showing the improved locking means applied thereto; Fig. 2 is a side elevation; Fig. 3 is a view similar to Fig. 2 but taken at right angles thereto; Fig. 4 is a vertical section through a nut and a portion of the bolt; Fig. 5 is a detail view of the locking key; and Fig. 6 is a detail view of the locking member.

Referring to the drawings by numerals, 1 designates a bolt which is provided with a plurality of longitudinally extending semicircularly-shaped grooves or recesses 2, and a nut 3 which is adapted for threaded engagement with said bolt. A semicircularly-shaped recess 4 is provided in the wall of the bore of the nut and is adapted to be alined with any one of the recesses 2 when it is desired to lock the nut upon the bolt.

A locking key 6, of a diameter substantially equal to the diameters of the recesses 2 and 4, is adapted to be inserted within these recesses to lock the nut upon the bolt. It being readily seen that when the recesses in the nut 3 and bolt 1 are alined and the key 6 inserted therein, turning movement of the nut upon the bolt will be effectually prevented.

In order to lock the key against accidental disengagement from the recesses, one end of the key is provided with an eye 7. This key is of substantially inverted U-shape and comprises the downwardly extending portion which engages the recesses of the nut and bolt, a laterally extending portion 8 which extends over the outer face of the nut, and a second downwardly extending portion 9 which engages one side of the nut and which is provided at its lower end with the eye 7. This key is engaged with the nut and bolt as set forth, and a locking member 10, having a bent portion 11 formed on one end thereof, is adapted to be inserted within an opening 12 formed in one corner of the nut and communicating with two sides thereof with the bent portion 11 in engagement with the eye 7. The free end of the member 10 is then bent toward the corner of the nut to prevent accidental disengagement of the same from the nut and to efficiently lock the member 6 in a position to lock the nut upon the bolt.

It will thus be seen that the nut is securely locked upon the bolt by means of the key 6, and that the key 6 is locked against accidental disengagement from its locking position by means of the member 10.

From the foregoing description taken in connection with the accompanying drawings it is thought that the construction and operation of the device will be clearly understood and while I have herein shown and described one specific form of my invention I do not wish to be limited thereto except for such limitations as the claim may import.

What is claimed is:—

In a nut lock comprising a bolt having a longitudinal recess formed therein, a nut having a similar recess to be alined with the aforesaid recess at certain times to provide a key-way, a key to be positioned in said key-way, said key having its intermediate portion bent to lie on the upper face of said nut, the other end of said key lying in intimate relation to one of the outer faces of said nut and having an eye lying against the respective face of the nut, said nut provided with a transverse bore communicating with two faces thereof and in registry with the aforesaid eye, and a second key positioned through said bore and having its one end
5 passed through said eye for retaining said first mentioned key in position, as and for the purpose specified.

In testimony whereof I affix my signature in presence of two witnesses.

CHARLES O. BAUGHN.

Witnesses:
FRED BROUGH,
ELMER MILLS.

Copies of this patent may be obtained for five cents each, by addressing the "Commissioner of Patents, Washington, D. C."